United States Patent
Hosein

(12) 
(10) Patent No.: US 6,442,139 B1
(45) Date of Patent: Aug. 27, 2002

(54) ADAPTIVE RATE CONTROL BASED ON ESTIMATION OF MESSAGE QUEUING DELAY

(75) Inventor: Patrick A. Hosein, Holmdel, NJ (US)

(73) Assignee: AT&T, New York, NY (US)

( * ) Notice: Subject to any disclaimer, the term of this patent is extended or adjusted under 35 U.S.C. 154(b) by 0 days.

(21) Appl. No.: 09/015,746

(22) Filed: Jan. 29, 1998

(51) Int. Cl.$^7$ ............................................... H04L 12/26
(52) U.S. Cl. ...................................... 370/236; 370/468
(58) Field of Search ................................ 370/412, 468, 370/252, 229–238, 230.1, 235.1, 236.1, 238.1, 236.2

(56) References Cited

U.S. PATENT DOCUMENTS

| | | | |
|---|---|---|---|
| 5,072,444 A | * 12/1991 | Breeden et al. | 370/236 |
| 5,570,346 A | * 10/1996 | Shur | 370/231 |
| 5,689,505 A | * 11/1997 | Chiussi et al. | 370/388 |
| 5,822,537 A | * 10/1998 | Katseff et al. | 709/231 |
| 5,864,538 A | * 1/1999 | Chong et al. | 370/235 |
| 5,936,940 A | * 8/1999 | Marin | 370/232 |
| 6,141,323 A | * 10/2000 | Rusu et al. | 370/236 |
| 6,219,728 B1 | * 4/2001 | Yin | 710/52 |

OTHER PUBLICATIONS

Farel, Richard A. and Gawande, Mohan, *Design and Analysis of Overload Control Strategies for Transaction Network Databases*, AT&T Bell Laboratories, Holmdel, New Jersey, USA, pp. 115–120.

* cited by examiner

*Primary Examiner*—Chau Nguyen
*Assistant Examiner*—Jasper Kwoh

(57) ABSTRACT

A novel system for regulating traffic in a communications network by adaptive rate control is disclosed. In a network system having time sensitive messages that require processing within certain time limits, the load queued at network elements with at least one message processor is dynamically controlled to prevent the message processor from becoming overloaded and thereby causing queued messages from timing out without being processed. A threshold value based on a processing parameter such as when a message times out is compared to an average queuing delay and the controlled load is varied in response thereto. Each message processor determines one or more processing statistics from which a controlled load rate applied to at least one source controller is determined. By dynamically varying the controlled load and not merely relying upon a fixed buffer to control message queues, the novel system disclosed herein can respond to changes in the offered load and/or service rate without overloading the message processor.

9 Claims, 3 Drawing Sheets

ADAPTIVE RATE CONTROL BASED ON ESTIMATION OF MESSAGE QUEUING DELAY

FIELD OF THE INVENTION

The invention relates generally to traffic regulation in a communications network. More particularly, the invention relates to regulating the flow of traffic to message processors by adaptive rate control based on message queuing delay.

BACKGROUND OF THE INVENTION

Telecommunication networks typically operate in real time. Operating in real time imposes strict requirements on the permissible boundaries of end to end message delays. However, as the network traffic load increases so do the delays at network nodes. These nodal delays can result in network traffic slowing to the point that messages can no longer be transmitted across the network without exceeding the permissible boundaries for message delays. When this occurs, messages are discarded and must be retransmitted. Unfortunately, unless the load decreases or the message handling capability of the network increases, the retransmitted messages simply add to the load on the already overloaded network with potentially catastrophic effects.

This catastrophe is readily averted by simply slowing down the number of incoming messages at the source. In the public switched telephone network, for example, a caller will hear a busy signal or a recorded message stating all lines are busy and requesting that the call be placed at a later time. Accordingly, the network load is regulated at the source by restricting access to the network.

However, regulating access to the network is often impractical and is difficult, if not impossible, to effectively coordinate with the processing capabilities of various network elements. But the load on a particular network element can be regulated more flexibly and with greater responsiveness. Accordingly, overload is prevented or reduced by regulating the load at network elements (i.e., message processors). A typical procedure for regulating a message processor load is fixing the maximum number of messages that can be queued at the processor by establishing a finite input buffer. Any incoming messages received after the input buffer fills will be discarded, but any accepted messages will be processed before timing out.

Network management overload controls sent from a message processor to a source controller are typically used to prevent messages from being timed out. An overloaded message processor will send a control message to a source controller controlling the load on the message processor requesting a reduction in the offered load. The source controller can then divert the incoming messages to another message processor or, in turn, send a message upstream requesting a reduction in the offered load applied to the source controller. In circumstances where the message processor service rate is static, a fixed buffer threshold can generally provide acceptable performance.

However, variable service rates may exist in a network element for a variety of reasons. For example, if the network element is a multiprocessor system, then the service rate may vary as processors are brought in and out of operation or processors and other components are upgraded (or downgraded). Alternatively, a single network element may, for example, provide several services with different processing rates, resulting in varying message processing times.

Unfortunately, a dynamically varying service rate requires a concurrently varying buffer threshold to avoid having a buffer which is either too long (in which case accepted messages will time out before being processed) or too short (in which case messages will be turned away which could have been accepted and processed). Either result is generally considered undesirable in an efficiently operating network. Therefore, a predetermined buffer threshold is not acceptable in a network element that has variable service rates, and there is a need for a flexible system capable of responding to dynamic variations.

SUMMARY OF THE INVENTION

In view of the foregoing, there is a need for a system which can accommodate stochastic time-varying service rates and traffic loads while providing for efficient resource utilization. Such a system maintains the message queuing delay for each processor at or below the threshold value at which a message will time out and be discarded. If the message queuing delay is too far below the threshold value then, because of normal fluctuations in the offered load, the queue may become empty, in which case the processor is not fully utilized, possibly causing other message processors in the network to be overloaded or requiring augmentation of the network with additional message processors that would not be needed if every processor were optimally queued. On the other hand, if the message queuing delay is too close to the threshold value, then random variations in message processing will result in accepted messages timing out because the actual delay will exceed the threshold.

The present invention achieves this by dynamically varying the number of messages queued for the message processor rather than relying upon a single buffer threshold as in prior art systems. Buffer overflow is not considered to be a significant restraint in the present invention as a physically large buffer is contemplated. Use of large buffers is considered highly practicable in view of the marked trends toward lower cost and higher density in commercially available memory systems. In fact, at least with respect to contemporary processing speeds, the buffer may be regarded as essentially infinite in so much as the message holding capacity of a commercially practicable system far exceeds the limits imposed by the message timeout boundaries typically encountered in telecommunications and data processing networks.

Although buffer overflow is not considered a significant constraint, keeping enough messages queued so the message processor is neither idled (i.e., no messages queued) nor overloaded (i.e., so many messages queued that messages time out before being processed) are considered significant constraints. Accordingly, the present invention maintains the average queuing delay at a specified value by varying the controlled load applied to the message processor. When the average queuing delay drops below the specified value, the controlled load is increased accordingly, resulting in more messages being queued and processed. Similarly, when the average queuing delays rises above a specified value, the controlled load is decreased, resulting in a decrease in the average queuing delay.

By dynamically varying the number of messages queued in response to the average message queuing delay rather than simply queuing a predetermined number of messages as in the prior art, the present invention is able to dynamically respond to changes in either the service rate (e.g., the rate at which messages are serviced by the processor) or the load rate (i.e., the rate at which messages are queued). As discussed below, the average message delay may be determined several different ways. Once the average message delay is determined, it can be used to detect and control overload in a network element, advantageously reducing congestion and increasing processing optimization in the network.

In a preferred embodiment of the present invention, the messages being processed are database queries such as those processed in a telecommunications network. For example, these database queries are of the type processed by directory information databases in a typical telecommunications network switching system whenever a call is processed. These database queries are related to the service(s) provided, and may, therefore, involve differing processing times depending on the specific service and the database query.

Referring to FIG. 1, a portion of a network switching system such as may be used in a public switched telephone network is illustrated. A connecting network 1 provides a plurality of links between a plurality of access nodes 2–2' and one or more database nodes 3. Each access node 2 may be, for example, a local exchange carrier (LEC) which itself interfaces with a plurality of telephone terminals (not shown). When a telephone call is placed, a database 3 is queried to identify the processing required for each call in accordance with the dialed telephone number and/or the originating number. A response must be received from the database 3 before the call can be processed.

However, because of the variety of services offered and other factors, the processing time for each call is variable. Accordingly, it is not possible to precisely forecast the maximum rate of database query responses based on a fixed parameter and thereby limit the number of calls in the system to prevent calls from timing out when the database 3 cannot respond to a query in the allotted time period. Moreover, databases are frequently replicated throughout the telephone system network in order to increase the number of calls which can be processed concurrently. For example, if a single database server can respond to 7500 queries in a second and there are 6 replicated database servers in the system, then the system has a processing capacity of 45,000 queries per second, assuming a fixed processing time for each query. However, the number of fully functional database servers may vary dynamically (e.g., a database server could fail or performance could be degraded) or the processing time for each query may be variable. Under these circumstances, it becomes necessary to regulate the number of incoming calls to prevent calls from timing out without being properly connected. As discussed below, a variety of distinct control methods may be utilized to regulate the number of incoming calls received from one or more of the access nodes or network inputs. These control methods may be advantageously combined with the message queuing delay technique for detecting processor overload to maintain network efficiency in response to varying load and/or varying processing rates.

DETAILED DESCRIPTION

A novel system for network traffic management in a telecommunications network based upon adaptive rate control from the network processing elements is described herein. By dynamically varying the rate at which messages are presented to a message processor, processor overload and network congestion are minimized. The present invention is advantageously scalable and can provide adaptive rate control in a network environment with one or more sources and one or more message processors. In a preferred embodiment of the present invention, each message processor is a database query engine and incoming messages to be processed are telephone calls entering the network at one or more access nodes. The number of messages entering the network through an access node is regulated by the specific control method applied as discussed below.

Figure 1:
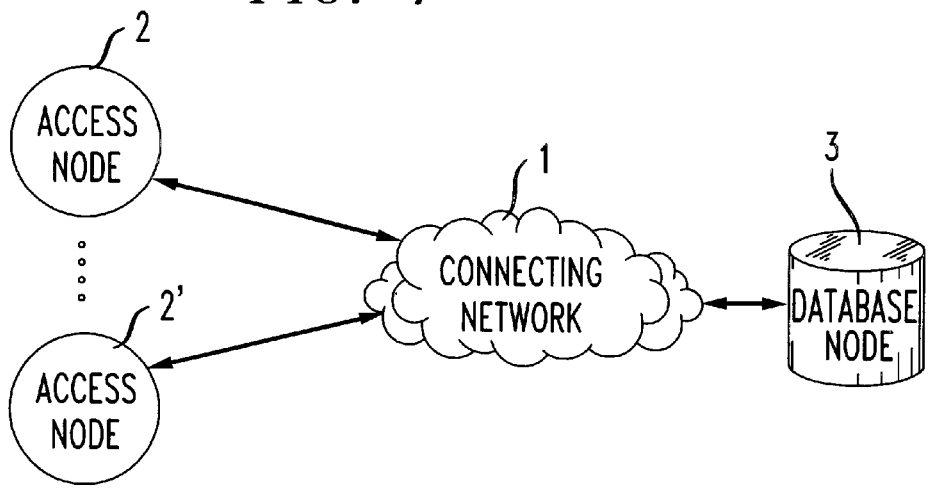
FIG. 1 is an illustration of a transaction network including access nodes and a database node.
Figure 2A:
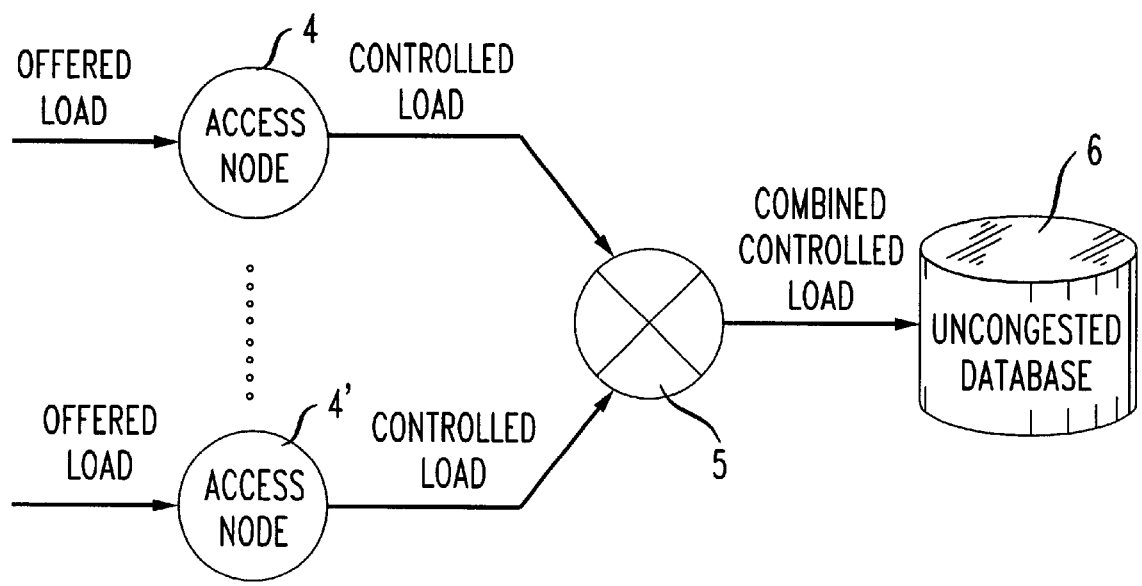
FIG. 2a is a block diagram representation of a generic transaction network where the database is uncongested.

Referring to FIG. 2a, a generic transaction-oriented network such as a telecommunications network is illustrated. A plurality of access nodes 4–4' each receive an offered load of incoming calls as input. If there is no congestion and none of the message processors are being overloaded, then all calls in the offered load are output from each access node 4–4' as controlled load. The controlled loads are combined at a signal transfer point 5 and the combined controlled load is applied to the database 6 for processing.

Figure 2B:
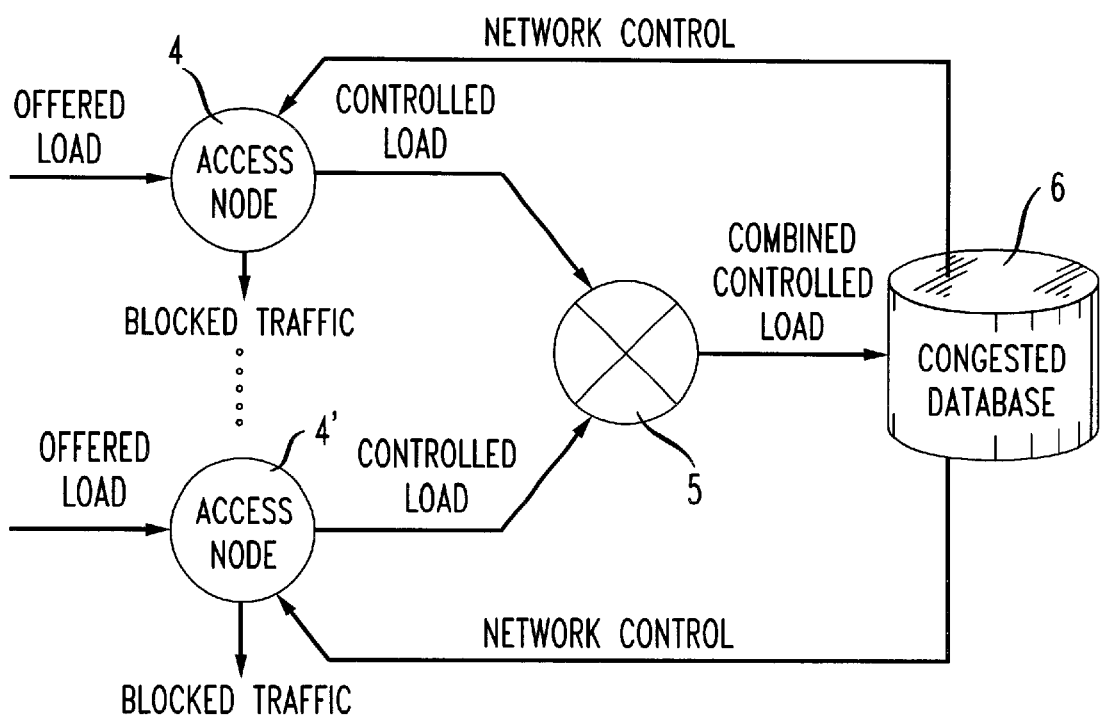
FIG. 2b is a block diagram representation of a generic transaction network where the database is congested.

If, however, there is network congestion, then some of the incoming offered load at each access node 4 is output as controlled load and the remainder of the incoming offered load is discarded as blocked traffic as shown in FIG. 2b. The controlled load output of each access node 4–4' is combined at signal transfer point 5 for output at the combined controlled load to the congested database 6. The degree of database congestion is determined from the average message delay of the combined control load. In a preferred embodiment of the present invention, the database is considered congested when the average message delay reaches or exceeds a threshold value. By determining network congestion from average message delay instead of from whether a fixed input buffer size has been exceeded as in the prior art, present invention is advantageously able to dynamically respond to both sudden and gradual changes in message processing capabilities. Network control signals are provided to the access nodes 4–4' which regulate the incoming traffic (offered load) by blocking or discarding a portion of the offered load and transmitting the remainder as controlled load.

Figure 3:
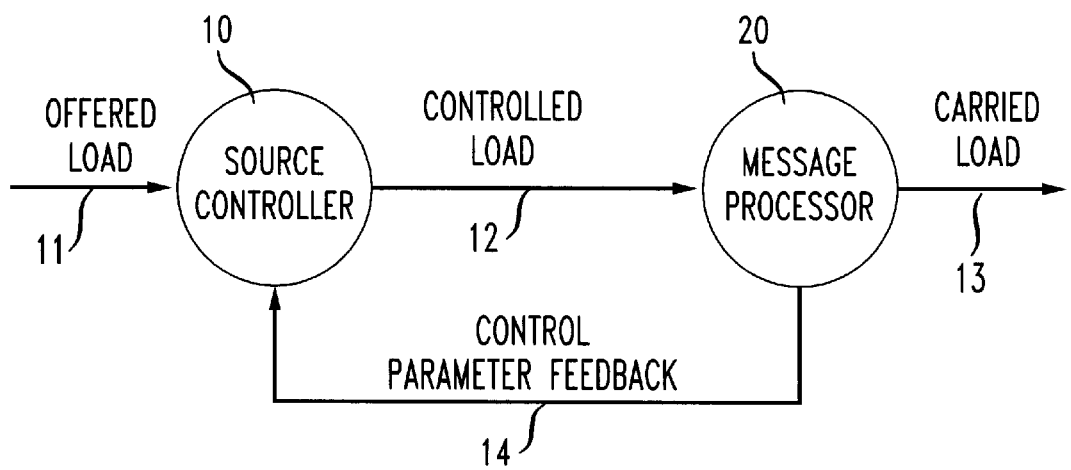
FIG. 3 is an illustration of a network element in accordance with the present invention.

The present invention is generally applicable to any network system wherein messages are received and processed and is not necessarily limited to systems where the messages are database queries. Referring to FIG. 3, a message processing system in accordance with the present invention is illustrated. Source controller 10 receives an offered load 11 as input and outputs a controlled load 12. The controlled load 12 is applied to message processor 20 which processes the messages of the controlled load 12 in regular control intervals or periods. Message processor 20 may be a single processor or a multi-processor system that processes messages and computes statistics relating to the message processing that occurred during each control intervals or periods. The statistics computed during a control interval or period are used by message processor 20 to determine a control rate for the next control interval or period. Message processor 20 outputs the desired control rate as control parameter feedback 14 to source controller 10 which then regulates the controlled load 12 in accordance with the received control parameter feedback 14. The specific technique utilized by source controller 10 to regulate the controlled load 12 is implementation specific. However, certain techniques such as automatic call gapping, as discussed below, are preferentially utilized in a telecommunications network environment.

Figure 4:
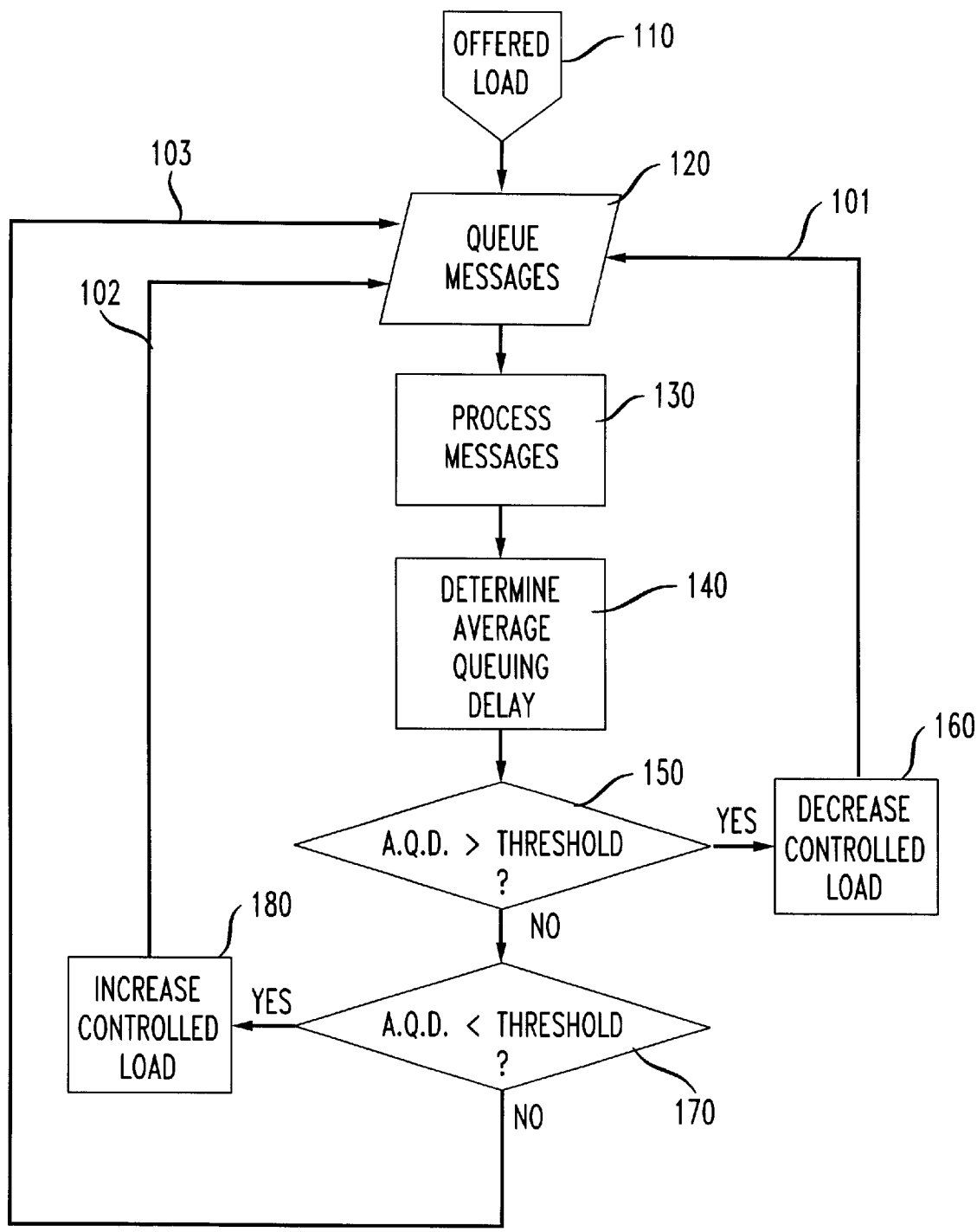
FIG. 4 is a flowchart representation of a method for varying the controlled load in a network element in accordance with the present invention.

Referring to FIG. 4, a technique by which the average queuing delay is maintained at a desired level in a message processing network as illustrated in FIG. 3 is illustrated. Messages are received for processing from one or more external sources (e.g., the offered load) as shown by data input symbol 110. A source controller determines how many of the messages in the offered load are queued for processing by the message processor, the messages passed by the source controller comprising the controlled load. In a telecommunications environment, messages which are not passed by the source controller are blocked and discarded, although discarded messages may reappear in the offered load until the message is processed. In general, rate-based controls are not affected by retries, although call-gapping and percent blocking are affected by retries that can increase the controlled load. In other environments the blocked messages may be simply discarded or the source may be instructed to retransmit the message, such as, for example, in a data communications network where data packets are switched and the message processor is a router or gateway.

Referring to input/output block 120 of FIG. 4, messages that are not blocked by the source controller are queued for processing by the message processor. The message processor then processes some or all of the queued messages during a control interval as shown by processing block 130. It should be noted that, although an individual message is queued and then processed sequentially, queuing of messages and processing of messages proceeds concurrently.

Referring to processing block 140 of FIG. 4, the average queuing delay during the control interval is determined. The average queuing delay is compared to a threshold value and the controlled load rate is adjusted accordingly. The threshold value is preferentially set low enough to prevent queued messages from timing out (i.e., shorter than the time period in which a message times out) and high enough to prevent the message processor from being starved or idled. In a preferred embodiment, the threshold level is set below the time out threshold to allow for random fluctuations in processing time and offered load. Referring to decision block 150, if the average queuing delay is greater than the threshold value, then the controlled load rate is decreased as shown by processing block 160. Referring to decision block 170, if, on the other hand, the threshold value is greater than the average queuing delay, the controlled load rate is increased as shown by processing block 180. Referring again to decision block 170, if the average queuing delay equals the threshold value, then the controlled load rate is not changed.

It is, of course, not always necessary to regulate the controlled load. In those situations where the processing rate exceeds the offered load rate, the controlled load rate is simply equal to the offered load rate. The number of messages from the offered load are regulated by a source controller that generates a controlled load from the offered load. It is only when the message processor becomes congested and messages are queued for too long to be processed before timing out that the controlled load needs to be regulated or throttled.

In an embodiment of the present invention where the message processing or service rate is accurately known, the controlled load rate for the next control interval may be determined from the service rate during the concurrent control interval. Given a desired queuing delay of $\Omega$, the desired control load rate, $\lambda$, may be expressed by the following equation.

$$\lambda_{(k+1)} = \mu(kT)\left[1 - \frac{\frac{\eta_k}{\mu(kT)} - \omega}{T}\right] \quad (1)$$

As shown in equation 1, the controlled load rate for the next, (i.e., k+1), interval, $\lambda_{k+1}$, may be determined from the following: the length of the control interval, T; the service rate for the current, (i.e., k), interval, $\mu(kT)$; the number of messages queued, $\eta_k$; and the desired queuing delay, $\omega$.

In most embodiments, however, the processing rate, $\mu$, is not precisely known for an interval and must be estimated. Assuming that the number of messages processed during a control interval is known, which can be readily determined since each message is checked to determine if it has timed out and can therefore be readily counted, then the estimated service rate, v, can be determined from the number of messages processed. The accuracy of the estimated service rate, v, can be improved by exponential smoothing. Accordingly, the estimated service rate, v, may be determined as shown in the following equation where $m_k$ represents the number of messages processed during the kth control interval and $\alpha$ represents the smoothing factor.

$$v_k = \alpha v_{k-1} + (1-\alpha)\frac{m_k}{T} \quad 0 < \alpha \leq 1 \quad (2)$$

If the service rate changes gradually over time, the the smoothing factor, $\alpha$, should have a value near 1. If, however, the service rate is subject to abrupt changes and varies widely over time, the smoothing factor, $\alpha$, should have a value near zero. In an embodiment of the present invention where the service rate changes over time but typically without abrupt changes and the smoothing factor has a value of ½, the estimated service rate, $v_k$, would be determined as shown in equation 3 below.

$$v_k = \frac{v_{k-1} + \frac{m_k}{T}}{2} \quad (3)$$

In an embodiment where the service rate is estimated, the controlled load rate is determined as shown in the equation 4 below.

$$\lambda_{(k+1)} = v_k\left[1 - \frac{\frac{\eta_k}{v_k} - \omega}{T}\right] \quad (4)$$

In another embodiment of the present invention where the number of messages queued (i.e., the buffer occupancy) is not precisely known, both the service rate and the queuing delay may be estimated to determine the controlled load rate. Although the number of queued messages is not known, the number of messages processed during the control period and the total delay for all messages processed during the control period are readily determined. The total delay may be readily determined by summing the delays of each message processed, the individual delays being known as they are checked to determine if each message should be timed out. If the sum of the message delays during the kth control interval is denoted by $S_k$, then the delay of a message received at the start of the next (i.e., k+1) interval may be estimated from $S_k/m_k$. Accordingly, the controlled load rate may be determined as stated in the following equation.

$$\lambda_{(k+1)} = v_k \left[ 1 - \frac{\frac{S_k}{m_k} - \omega}{T} \right] \quad (5)$$

In a preferred embodiment of the present invention, the length of the control interval, T, is established at a compromise value which takes into account both the desirability of a short interval to enable a quick response to changes in the load rate or service rate and the desirability of a long interval because computation and broadcast of control values (from the message processor to the source controllers or access nodes) consumes system resources which could otherwise be utilized for message processing. Accordingly, there is a need to balance response time with system resources, and the exact control interval value varies with the specific implementation.

In a preferred embodiment of the present invention, adaptive rate control is only active when queuing delay surpasses a minimum threshold. If the minimum activation threshold is set sufficiently low, the system resources utilized for adaptive rate control can be allocated to other tasks while the probability of the message processor becoming congested and timing out messages is acceptably low.

As noted above, a variety of control methods may be utilized by source controller 10 to regulate the controlled load 12 applied to message processor 20 in a telecommunications network. In one embodiment of the present invention, automatic call gapping is used. Automatic call gapping advantageously limits use of system resources because only a single parameter, the gap size, is provided to the source controller(s). Under automatic call gapping, a timer is set at the source controller each time a message (e.g., call) is received and queued on the message processor. The timer is set to the value of the gap size and all calls received until the timer expires (i.e., during the gap) are blocked. The next call received after the timer expires is accepted and queued on the processor.

In an alternative embodiment of the present invention, percent blocking is used to regulate the controlled load. As in automatic call gapping, percent blocking advantageously only transmits a single parameter to the source controller(s), the blocking probability. Under percent blocking, a fraction of the offered load equal to the blocking probability is blocked and the remainder is queued on the message processor. Percent blocking may be implemented by, for example, generating a random number (between 0 and 1) whenever a call is received and blocking the call if the generated random number is less than or equal to the blocking probability.

In another alternative embodiment, a rate based control is used. Unlike percent blocking or automatic call gapping, two parameters must be communicated to the source controller(s): an interval T and the number of calls to be allowed during the interval, n. Rate based control may be implemented by setting a timer to T and only allowing n messages or calls during T. If more than n calls are received during the interval, the calls are blocked. Rate based control can be readily implemented in an ATM or packet switched network where n tokens are provided at the beginning of each interval and any unused tokens are discarded at the end of the interval.

In a fourth alternative embodiment, an extension of automatic call gapping known as multiple calls per gap may be used to control the load. In the multiple calls per gap method, two parameters are fed back to the source controller (s), a gap interval g and a number n. Call gapping is the same as in automatic call gapping except that n calls or messages are allowed in between gaps instead of just one.

Although various embodiments are specifically illustrated and described herein, it will be appreciated that modifications and variations of the present invention are covered by the above teachings and within the purview of the appended claims without departing from the spirit and intended scope of the invention. For example, multiple sources and multiple processors may be coordinated by weighting techniques that provide differential handling for different message processors or source controllers based on predetermined prioritization and/or variable message prioritization.

What is claimed is:

1. A system for controlling processing load in a network element comprising:
   a message processor having a controlled load input, a carried load output, and a control parameter output; and
   a source controller having an offered load input, a controlled load output operably coupled to said controlled load input of said message processor, and a control parameter input responsive to said control parameter output of said message processor, wherein messages are coupled between said controlled load output and said controlled load input at a controlled load rate and said message processor determines said controlled load rate based upon the actual service rate,
   wherein messages are coupled between said controlled load output and said controlled load input at a controlled load rate and said message processor determines said controlled load rate based upon the actual service rate, the number of queued messages, a desired queuing delay, and the length of a control interval.

2. A system for controlling processing load in a network element comprising:
   a message processor having a controlled load input, a carried load output, and a control parameter output; and
   a source controller having an offered load input a controlled load output operably coupled to said controlled load input of said message processor, and a control parameter input responsive to said control parameter output of said message processor, wherein messages are coupled between said controlled load output and said controlled load input at a controlled load rate and said message processor determines said controlled load rate based upon the actual service rate,
   wherein messages are coupled between said controlled load output and said controlled load input at a controlled load rate and said message processor determines said controlled load rate based upon an estimated service rate, the number of queued messages, a desired queuing delay, and the length of a control interval.

3. The system for controlling processing load in a network element of claim 2 wherein said estimated service rate is based upon the number of messages processed during a control interval and the length of said control interval.

4. The system for controlling processing load in a network element of claim 2 wherein said estimated service rate is based upon a linear combination of an estimated service rate for a present control interval and an estimated service rate for a previous control interval.

5. The system for controlling processing load in a network element of claim 2 wherein said estimated service rate is based upon exponential smoothing of an estimated service rate for a present control interval and an estimated service rate for a previous control interval.

6. A system for controlling processing load in a network element comprising:

a message processor having a controlled load input, a carried load output, and a control parameter output; and a source controller having an offered load input, a controlled load output operably coupled to said controlled load input of said message processor, and a control parameter input responsive to said control parameter output of said message processor, wherein messages are coupled between said controlled load output and said controlled load input at a controlled load rate and said message processor determines said controlled load rate based upon the actual service rate, wherein messages are coupled between said controlled load output and said controlled load input at a controlled load rate and said message processor determines said controlled load rate based upon an estimated service rate, an estimated queuing delay, a desired queuing delay, and the length of a control interval.

7. A system for controlling processing load in a network element comprising:

a message processor having a controlled load input, a carried load output, and control parameter output; and a source controller having an offered load input, a controlled load output operably coupled to said controlled load input of said message processor, and a control parameter input responsive to said control parameter output of said message processor, wherein messages are coupled between said controlled load output and said controlled load input at a controlled load rate and said message processor determines said controlled load rate based upon a gap size.

8. A system for controlling processing load in a network element comprising:

a message processor having a controlled load input, a carried load output, and a control parameter output; and a source controller having an offered load input, a controlled load output operably coupled to said controlled load input of said message processor, and a control parameter input responsive to said control parameter output of said message processor, wherein messages are coupled between said controlled load output and said controlled load input at a controlled load rate and said message processor determines said controlled load rate based upon a blocking probability.

9. A system for controlling processing load in a network element comprising:

a message processor having a controlled load input, a carried load output, and a control parameter output; and a source controller having an offered load input, a controlled load output operably coupled to said controlled load input of said message processor, and a control parameter input responsive to said control parameter output of said message processor, wherein messages are coupled between said controlled load output and said controlled load input at a controlled load rate and said message processor determines said controlled load rate based upon the actual service rate, wherein a gap interval length and a number of messages to be coupled from said offered load to said controlled load in between each gap are used by said message processor to determine said controlled load rate.

* * * * *